United States Patent
Ryaboy et al.

(10) Patent No.: US 8,276,873 B2
(45) Date of Patent: Oct. 2, 2012

(54) INSTRUMENTED PLATFORM FOR VIBRATION-SENSITIVE EQUIPMENT

(75) Inventors: Vyacheslav M. Ryaboy, Irvine, CA (US); Warren Booth, Laguna Hills, CA (US); Thomas Rigney, II, Silverado, CA (US)

(73) Assignee: Newport Corporation, Irvine, CA (US)

(*) Notice: Subject to any disclaimer, the term of this patent is extended or adjusted under 35 U.S.C. 154(b) by 1874 days.

(21) Appl. No.: 10/971,623

(22) Filed: Oct. 22, 2004

(65) Prior Publication Data

US 2006/0086293 A1    Apr. 27, 2006

(51) Int. Cl.
*F16M 1/00* (2006.01)
(52) U.S. Cl. ......... 248/638; 248/559; 248/678; 248/550
(58) Field of Classification Search ............ 248/638, 248/559, 678, 550, 446, 464, 460, 463; 73/663, 73/664, 666
See application file for complete search history.

(56) References Cited

U.S. PATENT DOCUMENTS

| | | | | | |
|---|---|---|---|---|---|
| 4,164,151 | A | * | 8/1979 | Nolan et al. | 73/663 |
| 4,479,389 | A | * | 10/1984 | Anderson et al. | 73/651 |
| 4,729,239 | A | * | 3/1988 | Gordon | 73/593 |
| 5,170,104 | A | * | 12/1992 | Laughlin | 318/135 |
| 5,412,991 | A | * | 5/1995 | Hobbs | 73/663 |
| 5,517,857 | A | * | 5/1996 | Hobbs | 73/571 |
| 5,765,800 | A | * | 6/1998 | Watanabe et al. | 248/550 |
| 5,912,442 | A | * | 6/1999 | Nye et al. | 181/292 |
| 5,969,256 | A | * | 10/1999 | Hobbs | 73/663 |
| 6,202,492 | B1 | * | 3/2001 | Ohsaki | 73/662 |
| 6,220,100 | B1 | * | 4/2001 | Felkins et al. | 73/663 |
| 6,286,644 | B1 | * | 9/2001 | Wakui | 188/378 |
| 6,511,035 | B1 | * | 1/2003 | Teel et al. | 248/550 |
| 6,700,304 | B1 | * | 3/2004 | Fuller et al. | 310/321 |

* cited by examiner

*Primary Examiner* — Terrell McKinnon
*Assistant Examiner* — Steven Marsh
(74) *Attorney, Agent, or Firm* — Brian F. Swienton

(57) ABSTRACT

A vibration damper assembly that can be attached and moved about a payload surface of a table. The vibration damper assembly includes a sensor and a damper located within a housing. The housing can be attached to the payload surface by one or more fasteners. An operator can move the vibration damper assembly to different locations of the payload assembly to optimize the damping function of the assembly.

10 Claims, 8 Drawing Sheets

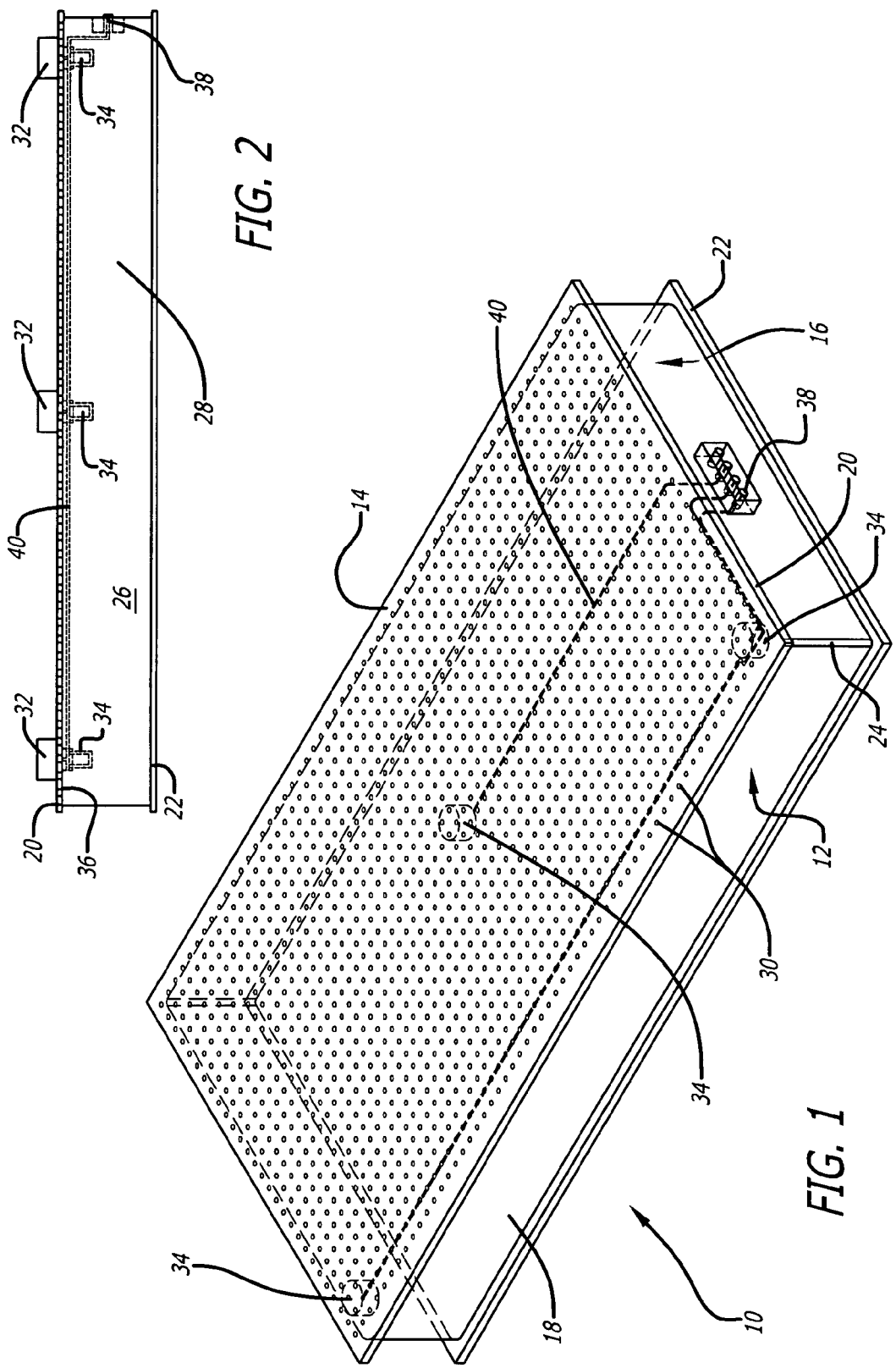

INSTRUMENTED PLATFORM FOR VIBRATION-SENSITIVE EQUIPMENT

BACKGROUND OF THE INVENTION

1. Field of the Invention

The subject matter disclosed generally relates to vibration isolators and industrial tables.

2. Background Information

There have been developed various tables for industrial use such as optical bench tables or vibration shaker tables. U.S. Pat. No. 5,154,963 issued to Terry discloses an industrial table that has a top plate, a bottom plate and a honeycomb structure that separates the plates. The honeycomb structure allows for threaded apertures in the top plate. External vibration-sensitive payload devices such as an optical component of an optical system, or a device under test in a shaker system, can be attached to the threaded apertures of the table.

In many experimental research and industrial applications it is desirable to isolate the table from external vibration such as the natural tremor of the building structure. U.S. Pat. No. 6,209,841 issued to Houghton et al. discloses an active isolation module that can be placed between the building floor and a table to dampen table vibration. The isolator includes a vibration sensor and an actuator that are connected to a controller. The sensor senses vibration and provides an output signal to the controller. The controller then processes the output signal and provides a drive signal to excite the actuator and offset the vibration.

The vibration isolators reduce the vibration transmitted to the table from the floor. The table top itself, however, has its own natural frequencies and corresponding flexural vibration modes that can be easily excited by residual vibration coming through the isolators or by other sources such as acoustical excitation, air turbulence and dynamic forces generated by the payload equipment installed on the table. The main flexural vibration modes usually have a global character, which means that an excitation at any point of the table generates a vibration pattern encompassing the whole table surface. Those natural vibrations are very lightly damped and therefore can reach high amplitudes unless special damping means are introduced into the table structure.

Passive dampers of various designs are widely used in construction of optical tables. The "Shock and Vibration Handbook", ed. By C. M. Harris, $4^{th}$ edition, 1996; $5^{th}$ edition, 2001, Ch. 37, provides a survey of the state of the art in this field and a classification of dampers (damping treatments). According to it, the known types of damping treatments include:

Free-layer damping treatments, where the energy is dissipated by means of extensional deformation of a damping layer (made of visco-elastic material) induced by flexural vibration of the base structure.

Constrained-layer damping treatments, where the constraining layer helps induce relatively large shear deformations in the visco-elastic layer in response to flexural vibration of the base structure, thereby providing more effective energy dissipation mechanism.

Integral damping treatments, including use of damped laminated sheets and/or damped joints in the construction assembly.

Tuned dampers, which are essentially mass-spring systems having resonances matched (tuned) to the resonance frequency of the base structure. The application of the tuned damper replaces the resonance peak of the base structure, typically, by two peaks of lesser amplitude.

Damping links, i.e., visco-elastic elements joining tow parts of the structure that experience large relative motion in the process of vibration.

Some of cited damping techniques have found applications in optical tables. In particular, Newport Corporation (see "The Newport Resource" catalog by Newport Corporation, 2003) uses tuned dampers, constrained layer treatment of work surfaces and integral damping in its optical table designs.

Nevertheless, the growing demand for high precision and high throughput in optoelectronics and semiconductor industries, as well as the needs of modern scientific experimental instruments, require higher damping performance of optical tables than that achieved by the methods and devices known in the state of the art. Active vibration control means are known to be able to achieve superior performance compared to passive control.

It is sometimes desirable to monitor the vibration level on the table. For example, in a precision measurement system the real-time vibration data could qualify or disqualify a certain measurement. In a precision manufacturing system, the real-time vibration data could indicate an increased probability of a particular manufactured item, such as a semiconductor wafer, being defective. Vibration monitoring is also necessary if the table in question is part of a vibration test setup.

The vibration signal may be used merely to indicate increased vibration levels on the platform during certain periods of time. In this case the vibration sensors can be placed at almost any point of the table because of the global character of main vibration modes; the areas near the corners of the table represent a good place for vibration sensors since these areas are responsive to all typical vibration modes of the table top. In other cases, the exact value of vibration input at a critical vibration-sensitive equipment location is of interest. In this situation the sensors should be placed immediately adjacent to the attachment points of the vibration-sensitive equipment.

Deployment of vibration measurement systems, including sensors and cables, on the working surface of the table would detract from the valuable payload space. It may be impossible to place the sensors near the most vibration-sensitive pieces of equipment due to space restrictions. In a production environment it may be impractical due to required set-up time. Therefore, a system monitoring the vibration of the table while leaving its surface clear and accessible to the user would be very desirable.

The essentials of the optical table design are disclosed in the U.S. Pat. No. 4,621,006, entitled "Honeycomb table manufacture and clean-room compatible honeycomb tables" issued to Terry et al. and U.S. Pat. No. 5,500,269, entitled "Honeycomb table manufacture and clean-room compatible honeycomb tables" issued to Terry. Additional details and variations can be found in U.S. Pat. No. 4,645,171, entitled "Honeycomb tabletop" issued to Heide, U.S. Pat. No. 5,061,541, entitled "Honeycomb tables" issued to Gertel, U.S. Pat. No. 5,626,157, entitled "Optical table" issued to Galpin et al. and U.S. Pat. No. 5,962,104, entitled "Optical Table" issued to Gertel et al. For an extensive general description of optical honeycomb tables, reference may be made to the 2000 Vibration Control Catalog and 2002-2003 "The Newport Resource" Catalogs by Newport Corporation. Catalogs of TMC, Kinetic Systems and other manufacturers also contain descriptions of optical table designs.

The vibration isolators are assembled to the table at predetermined locations to optimize damping. Sometimes the table will have vibration characteristics different than the analytical model. Additionally, one payload configuration may create different nodes and anti-nodes in the table than another payload configuration. It would be desirable to allow the operator to move the vibration damper(s) about the payload surface of a table to optimize damping of vibration even after the table is assembled.

BRIEF SUMMARY OF THE INVENTION

A vibration damper assembly that can be attached to a payload surface of a table.

BRIEF DESCRIPTION OF THE DRAWINGS

FIG. 1 is a perspective view of a platform;
FIG. 2 is a side sectional view of the platform.

DETAILED DESCRIPTION

Figure 3:
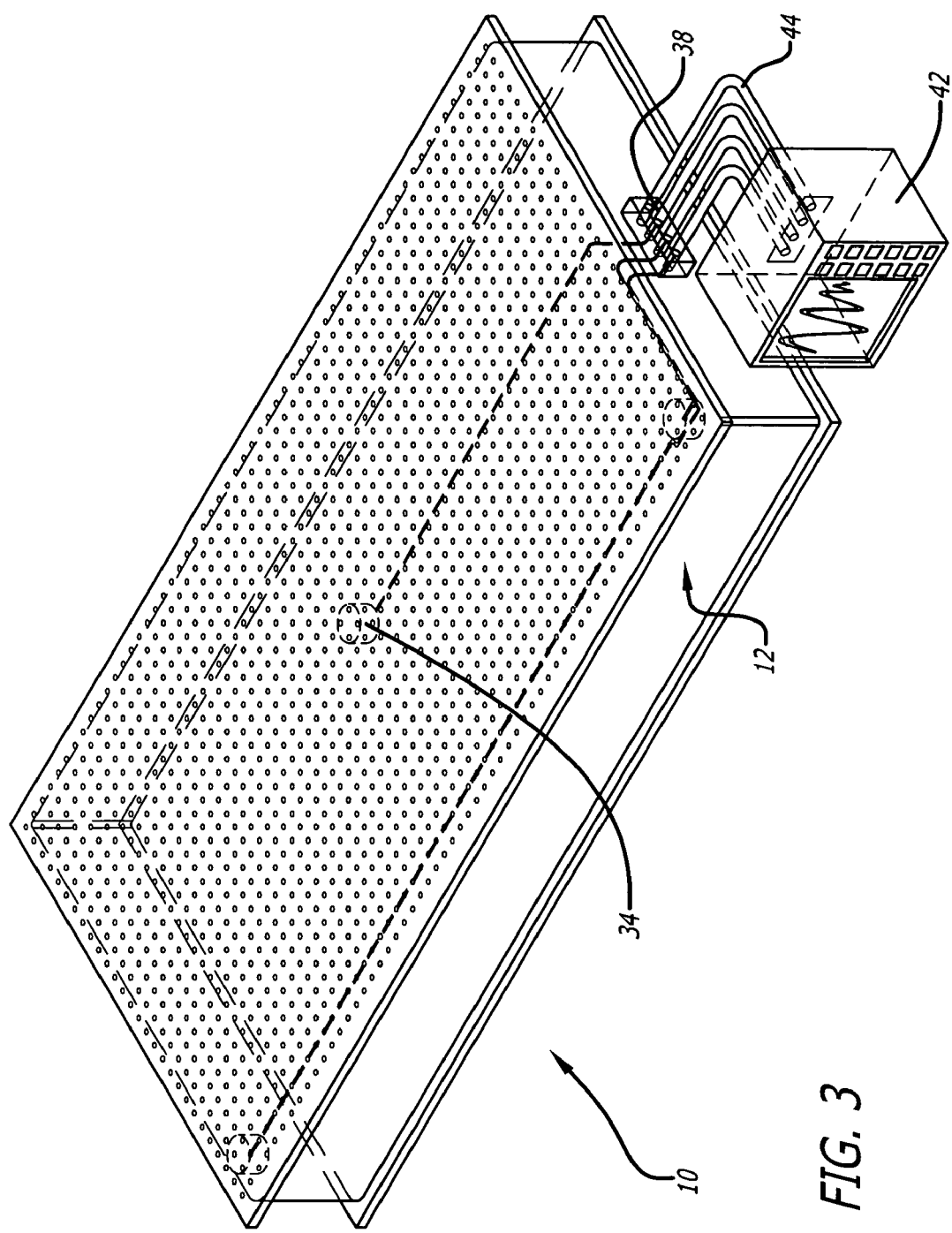
FIG. 3 is a perspective view of the platform coupled to a monitor.

Disclosed is a vibration damper assembly that can be attached and moved about a surface of a table or other work surface. The vibration damper assembly includes at least one sensor and at least one damper located within a housing. The housing may be attached to any surface of the table or work surface. For example, in one embodiment, the vibration damper assembly is configured to be attached to an optical table or platform configured to support any number of optical components. Exemplary optical work surfaces include, without limitation, optical tables, optical benches, optical breadboards, laser platforms, optical platforms, and the like. For example, in one embodiment, the housing may be coupled to a surface of an optical table adjacent to one or more table supports or legs. In an alternate embodiment, the housing may be coupled a surface of the optical table in opposition to the one of more table support structures or legs.

The housing may be configured to attach to a surface of a table or platform using one or more fasteners. For example, in one embodiment the vibration damper may be detachably coupled a surface of a table or platform. As such, an operator can move the vibration damper assembly to different locations of the table or platform, thereby permitting the operator to optimize the damping function of the assembly.

Referring to the drawings more particularly by reference numbers, FIGS. 1 and 2 show a platform 10. The platform 10 may include a table 12 that has a first surface 14, a second surface 16 and a plurality of side surfaces 18. The first surface 14 may extend along a first plate 20, the second surface 16 may extend along a second plate 22 and the side surfaces 18 may extend along one or more side plates 24.

The first plate 20 is separated from the second plate 22 by an inner core 26. The first plate 20 and second plate 22 of the platform 10 may be constructed of one or more materials including, without limitation, stainless steel, aluminum, carbon fiber, granite, steel, carbon steel, laminated metals, composite metals, wood, laminated woods, composite woods, formica, formica covered substrates, fiberglass, composite materials, Kevlar, cast iron, and the like. The first plate 20 and second plate 22 may be manufactured from a like material. In the alternative, the first plate 20 and second plate 22 may be manufactured from different materials.

Like the first and second plates 20, 22, the inner core 26 of the platform 10 may be manufactured from a variety of materials. Exemplary core materials include, without limitation, various metals and metallic composites including steel, titanium, aluminum, iron; granite; various woods and wood composites including medium density fiber board, particle board, and the like; cardboard, multiple component laminates; composite materials including carbon fiber, Kevlar, and the like; and similar materials. In one embodiment, the inner core 26 may contain a honeycomb structure 28 to provide support for the plates 20 and 22. Optionally, the inner core 26 may be constructed without a honeycomb structure.

Optionally, the first plate 20 and/or the second plate 22 may be configured to have any number of mounting devices coupled thereto. For example, the first plate 20 and/or the second plate 22 may include a plurality of threaded apertures 30 configured to receive at least a portion of a mounting device therein formed thereon. Optionally, the apertures 30 need not be threaded. Exemplary mounting devices include, without limitation, optical mounts, posts, lens supports, isolation supports or platforms, and the like. In an alternate embodiment, the platform 10 may be configured to support a variety of measuring devices or vibration-sensitive devices thereon. For example, the platform 10 may be configured to support a mass spectroscopy device, nuclear magnetic resonance (NMR) measuring device, or similar vibration-sensitive devices thereon. In an alternate embodiment, first plate 20 and/or the second plate 22 may be configured to have one or more mounts or similar devices magnetically coupled thereto. As such, the first plate 20, second plate 22, or both may be manufactured without apertures 30 therein. Optionally, the platform 10 may be configured to have one or mounts or devices coupled thereto using any one of a number of attachment methodologies. Exemplary alternate attachment methodologies include, without limitation, detachably coupled, non-detachably coupled, welded, adhesively coupled, friction coupled, electro-magnetically coupled, or the like.

Referring again to FIGS. 1 and 2, an external vibration-sensitive payload 32 may be attached to one or more threaded apertures 30 of the table 12. The payload 32 can be any type of device such as an optical component of an optical system, a device under test in a shaker machine, etc. Additionally, the table may be a platform for equipment used to fabricate semiconductor wafers, integrated circuits, etc. In general the table may be any platform used to support a component, system or equipment used in manufacturing or laboratory environments. For purposes of claim interpretation the terms "platform" or "table" do not include any structure of an airplane or building, including airplane wings, fuselage, building walls or foundations.

One or more vibration sensors 34 may be located within the inner core 26 and attached to an underlying surface 36 of the first plate 20. The vibration sensor(s) 34 may be any type of device, such as an accelerometer, a geophone or displacement sensor that can sense vibration. Although three vibration sensors 34 are shown, it is to be understood that any number of sensors 34 can be located at any location of the table. The sensor(s) 34 can be connected to an electrical connector 38 attached to one of the side plates 24 of the table 12. The sensor 34 may be connected to the connector 38 by wire cables 40 that run through the inner core 26. The sensor(s) 34 can provide an output signal that is transmitted to the connector 38 over the cables 40.

As shown in FIG. 3, a monitor and/or control device 42 can be coupled to the sensor(s) 34 by plugging cables 44 into the connector 38. The monitor and/or control device 42 may record and/or display vibration information provided by the sensor(s) 34. Optionally, the monitor and/or control device 42 may be configured to provide a control signal to a controllable damper (not shown) integrated into the table 10. Referring again to FIG. 3, by locating the vibration sensor 34 within the inner core 26, the sensor 34 can measure the vibration directly beneath the external device 32 thereby providing more accurate data. The electrical connector 38 allows the monitor 42 to be readily coupled to the sensor(s) 34 thereby minimizing set-up time for monitoring vibration in the table 12. Although cables 40 and a connector 38 are shown and described, it is to be understood that the sensor(s) 34 may have a wireless transmitter (not shown) that wirelessly transmits the output signal(s).

Figure 4:
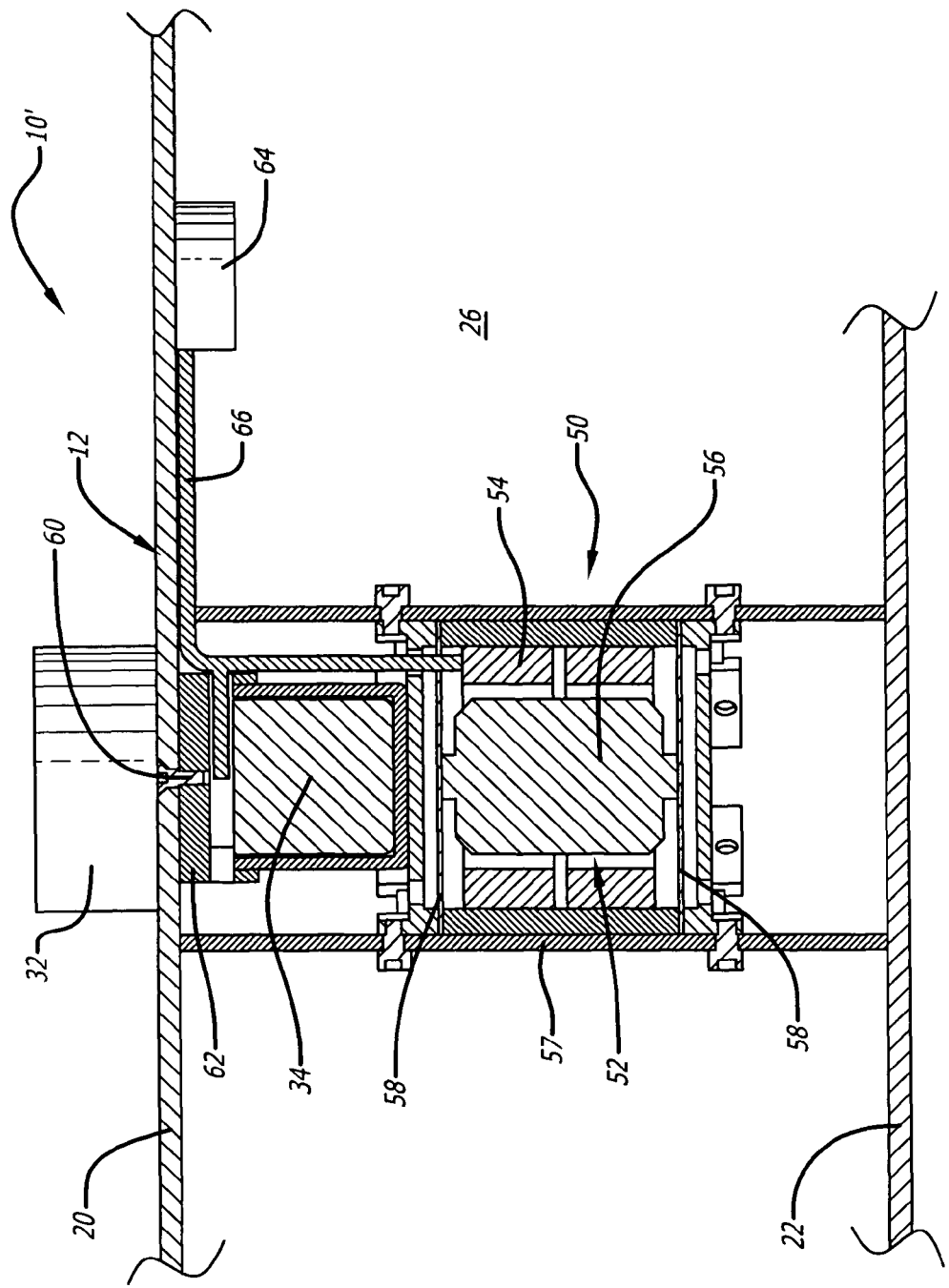
FIG. 4 is a cross-sectional view of an embodiment of platform with a damper in a table core.

FIG. 4 shows an embodiment of a table assembly 10' with a damper 50 located within the inner core 26. The damper 50 may include an actuator 52 such as a voice coil that can be excited to induce a vibration that offsets and cancels the vibration within the table 12. The actuator 52 may include an electrical coil 54 that is magnetically coupled to a magnet mass 56.

The magnet mass 56 may be coupled to an actuator housing 57 by a pair of flexible diaphragms 58. The housing 57 is attached to the plates 20 and 22. That diaphragms 58 function as springs which combine with the mass 56 to form a spring/mass assembly. Providing a current to the coil 54 generates a magnetic force that moves the mass 56. The coil 54 can be excited in a manner to generate, together with the spring/mass assembly, a dynamic force to offset vibration in the table 12.

The vibration sensor 34 can be coupled to the table 12 using any techniques generally known in the art. For example, the vibration sensor 34 may be coupled to the table using a screw 60 that extends through the top plate 20 and is attached to a sensor housing 62. The sensor 60 may be coaxial and rigidly coupled to the actuator 52. The sensor 60 provides an output signal to a control circuit 64. The control circuit 64 processes the signal and provides an excitation signal to the coil 54 to generate an offsetting vibration that cancels the table vibration. The control circuit 64 can be located within the inner chamber 26 and connected to the sensor 60 and coil 54 by cables 66.

Figure 5:
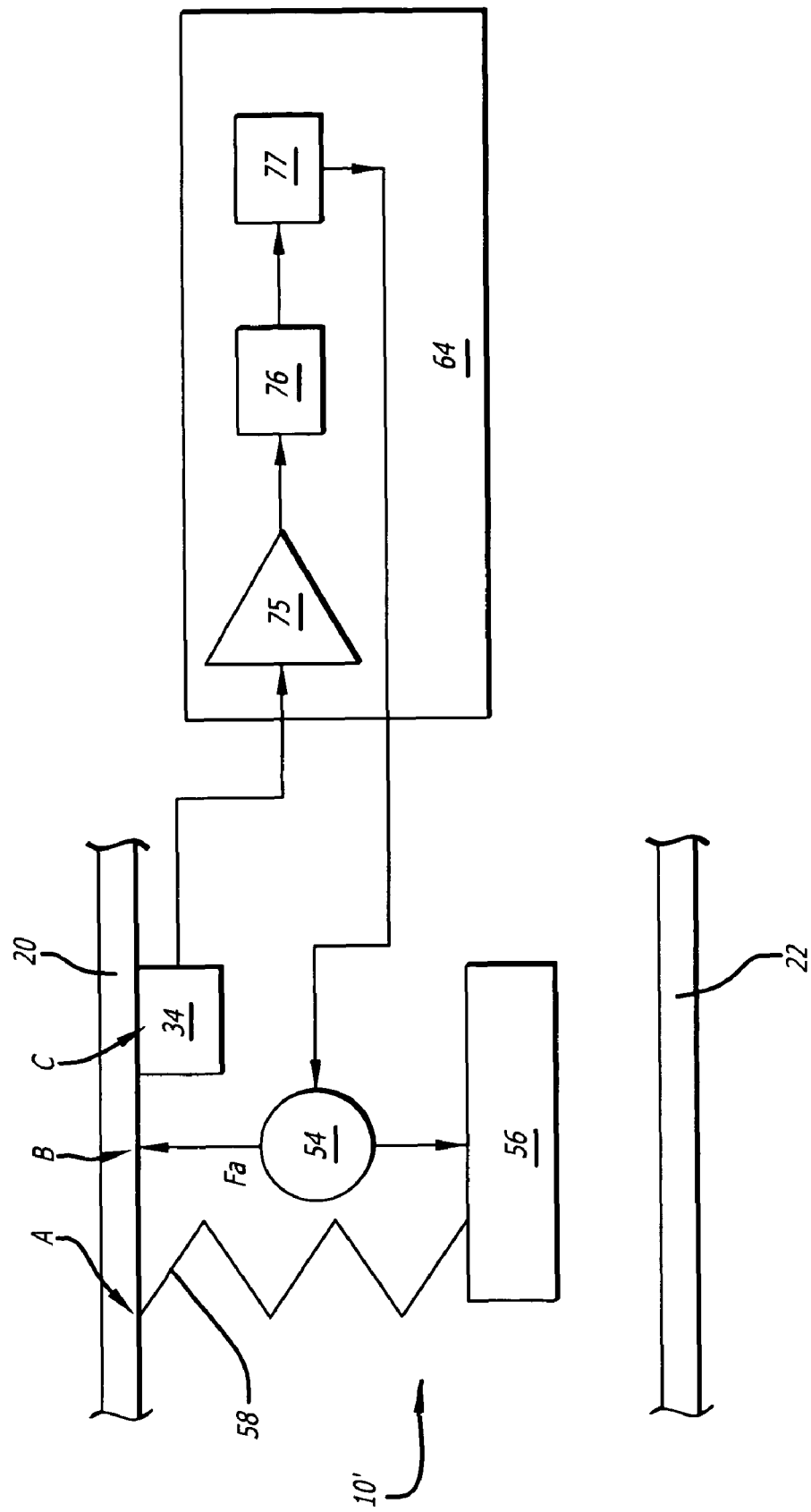
FIG. 5 is a schematic of a controllable damper in the table core.

FIG. 5 is a schematic of a controllable damper integrated into the table 10'. The signal from the vibration sensor 34 is transmitted to the controller 64.

The controller 64 may contain amplifiers 75, compensators 76 and filters 77. Digital control or analog control can be employed. The transformed signal is fed into the active element 54, such as a coil, of the actuator incorporated into the table structure. The vibration actuator may further comprise the reaction mass 56, which may contain magnets, and the flexure 58 that provides elastic coupling between the mass and the tabletop. The amplification gains and other parameters of the controller modules are assigned and coordinated with the characteristics of the sensor, actuator and mechanical assembly so that a force $F_a$ induced on the top face sheets of the table reduces the vibration at this point.

As control current flows through the coil 54, the electromagnetic force acts on the reaction mass 56, and the equivalent reaction force is acting on the stationary coils fastened to the table structure. The control loop is designed so that the phase and the amplitude of the summary force transmitted to the table structure counteract the vibration of the table. Methods for designing controller and actuators for vibration abatement are known in the art.

In one embodiment, the locations represented by points A, B and C in FIG. 5 be co-axial on the same vertical axis and rigidly connected. Optionally, the control loop may be designed such that the active force acting on the table emulates the effect of a viscous damper in the frequency domain encompassing the main natural frequencies of the flexural vibration of the table top. This approach creates inherent stability and robustness with respect to the changes in the payload. To implement this strategy, the transfer function of the controller should be designed as:

$$K(\omega) = \frac{-i\omega k}{A(\omega)S(\omega)} \quad (1)$$

Where;
$\omega = 2\pi f$ = a circular frequency.
$A(\omega)$ = the actuator (shaker) transfer function, or ratio of the total force N exerted by the actuator on the structure to input voltage, N/V.
$S(\omega)$ = the sensor transfer function, or the ratio of the sensor output voltage to the dynamic displacement, V/m.
$K(\omega)$ = the controller transfer function, V/V.
k = an adjustable gain.

As a result, the force exerted by the active system on the table structure will equal i$\omega$ku, where u is the dynamical displacement amplitude of the table, which is equivalent to the action of the viscous damping. Of course, other units can be used. The sensor may be an accelerometer, a velocimeter (such as a geophone) or a displacement sensor. Additional correcting filters may be used to improve the stability margins or other parameters.

Figure 6:
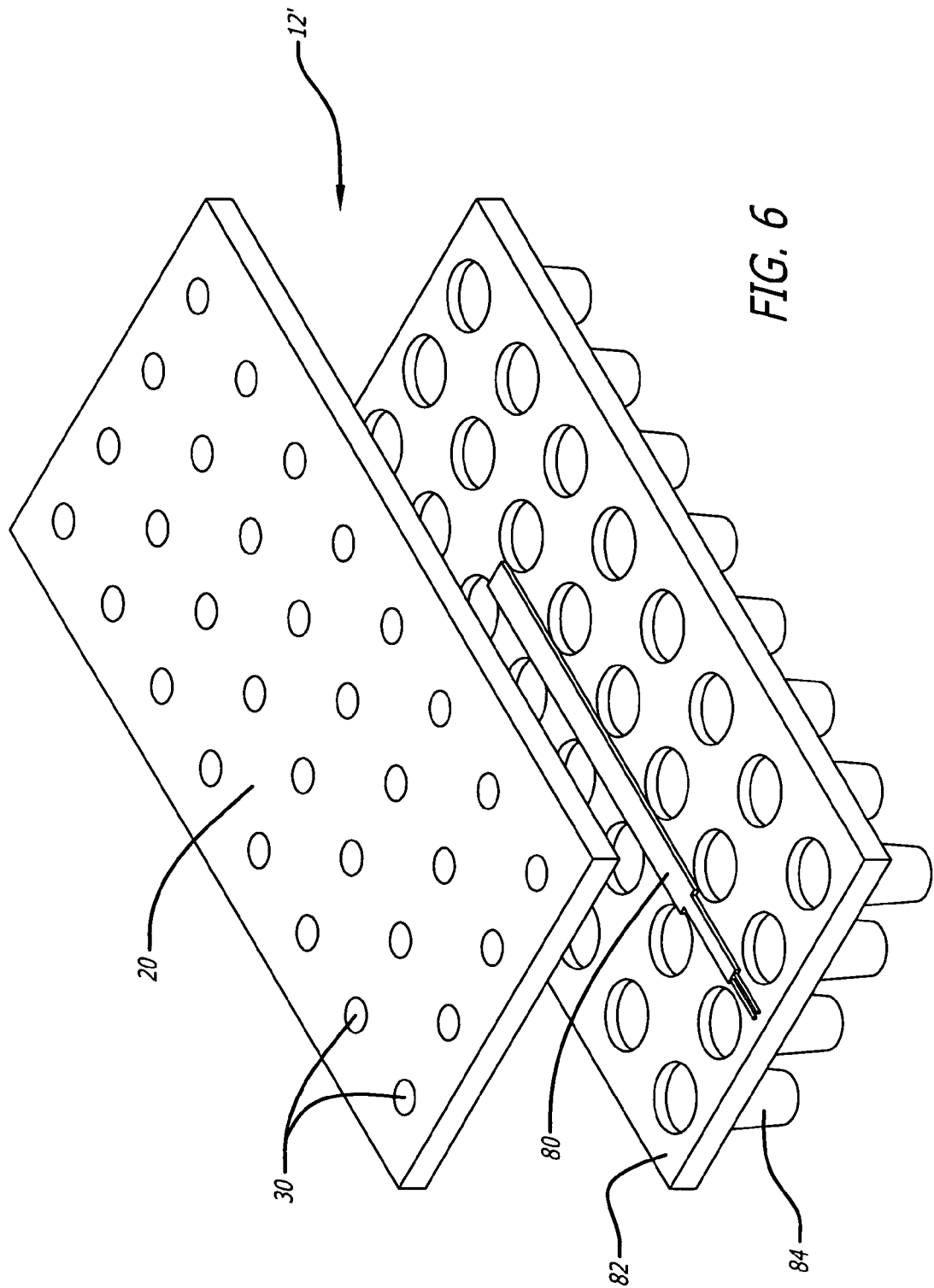
FIG. 6 is a perspective view of an embodiment of the platform.

FIG. 6 shows an alternate embodiment of a table 12 wherein a strip 80 is located between the top plate 20 and a hole sealing tile 82. The hole sealing tile 82 may have a plurality of cups 84 that are located adjacent to the threaded apertures 30 to collect debris that fall through the apertures 30. The strip 80 may be a piezoelectric device that functions as a sensor and/or an actuator. Alternatively, optical cables or other devices may be located between the plate 20 and tile 82 to provide sensing and/or actuating functions. The tile 82 can protect the strip 80 during the manufacturing process of constructing the table 12.

Figure 7:
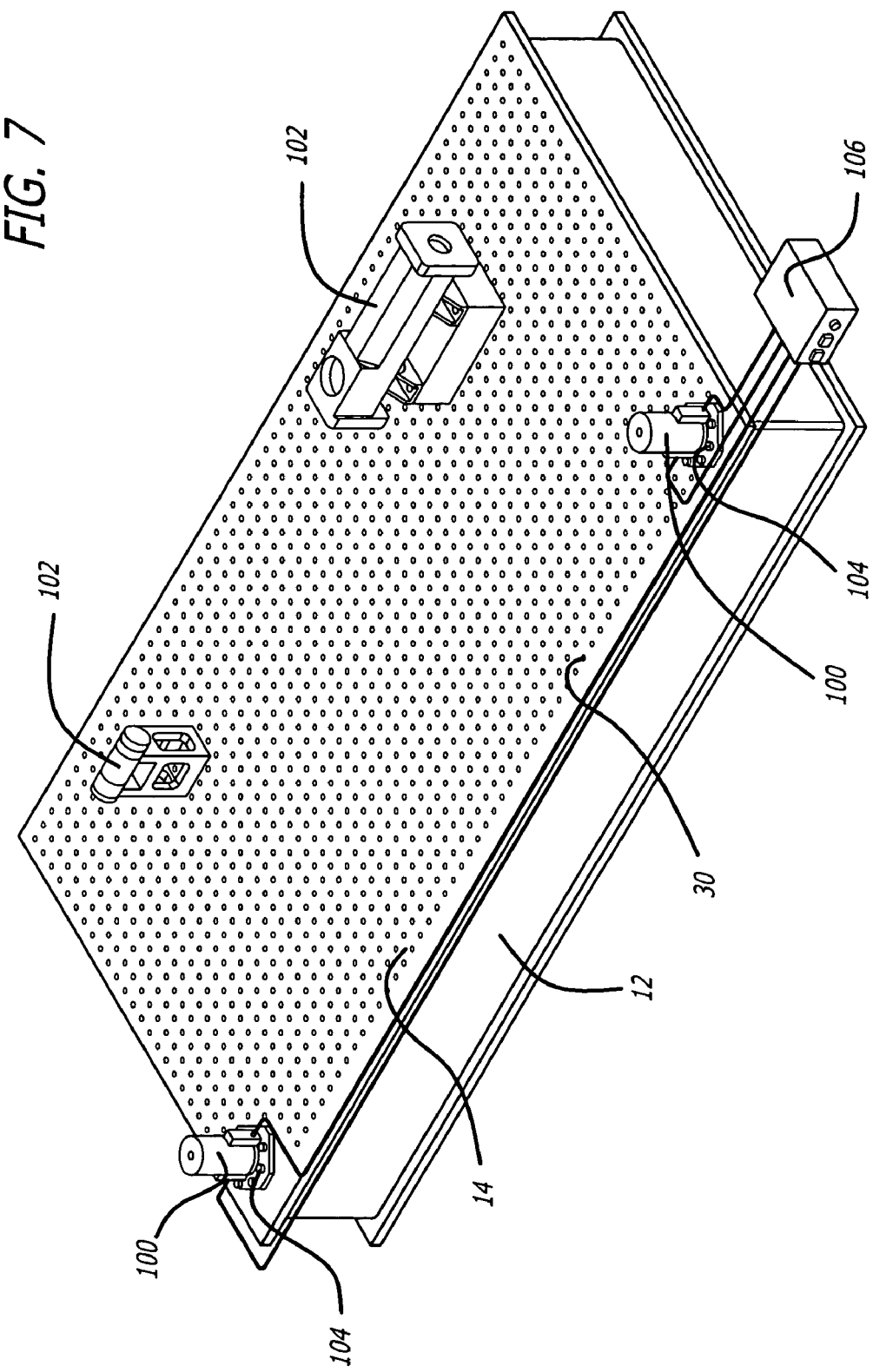
FIG. 7 is a perspective view showing a vibration damper assembly attached to a payload surface of a table.

FIG. 7 shows a pair of vibration damper assemblies 100 that are attached to the first payload surface 14 of the table 12. The payload surface 14 may support a payload such as a pair of optical devices 102. Each damper assembly 100 can be attached to different locations of the payload surface 14 using various device and/or methods. For example, in one embodiment, each damper assembly 100 is secured to the table 12 by fasteners 104 screwed into the threaded apertures 30 of the table 12. Optionally, each damper may be coupled to the table 12 using any variety of coupling techniques. Exemplary alternate coupling techniques include, without limitation, welding, adhesively bonding, magnetically coupling, clamping, and the like. Referring again to FIG. 7. As such, the damper 100 may be detachably or non-detachably coupled to the table. When detachably coupled to the table 12, the operator of the table 12 can detach and move each damper assembly 100 to a different location of the payload surface 14 to optimize the damping function of the assemblies 100.

The assemblies 100 are connected to a controller 106. The controller 106 may be the same or similar to the controller 64 shown in FIG. 5 and described in the accompanying text. Although an external controller 106 is shown and described, it is to be understood that at least one of the assemblies 100 may be modified to contain one or more circuits of the controller 106.

Figure 8:
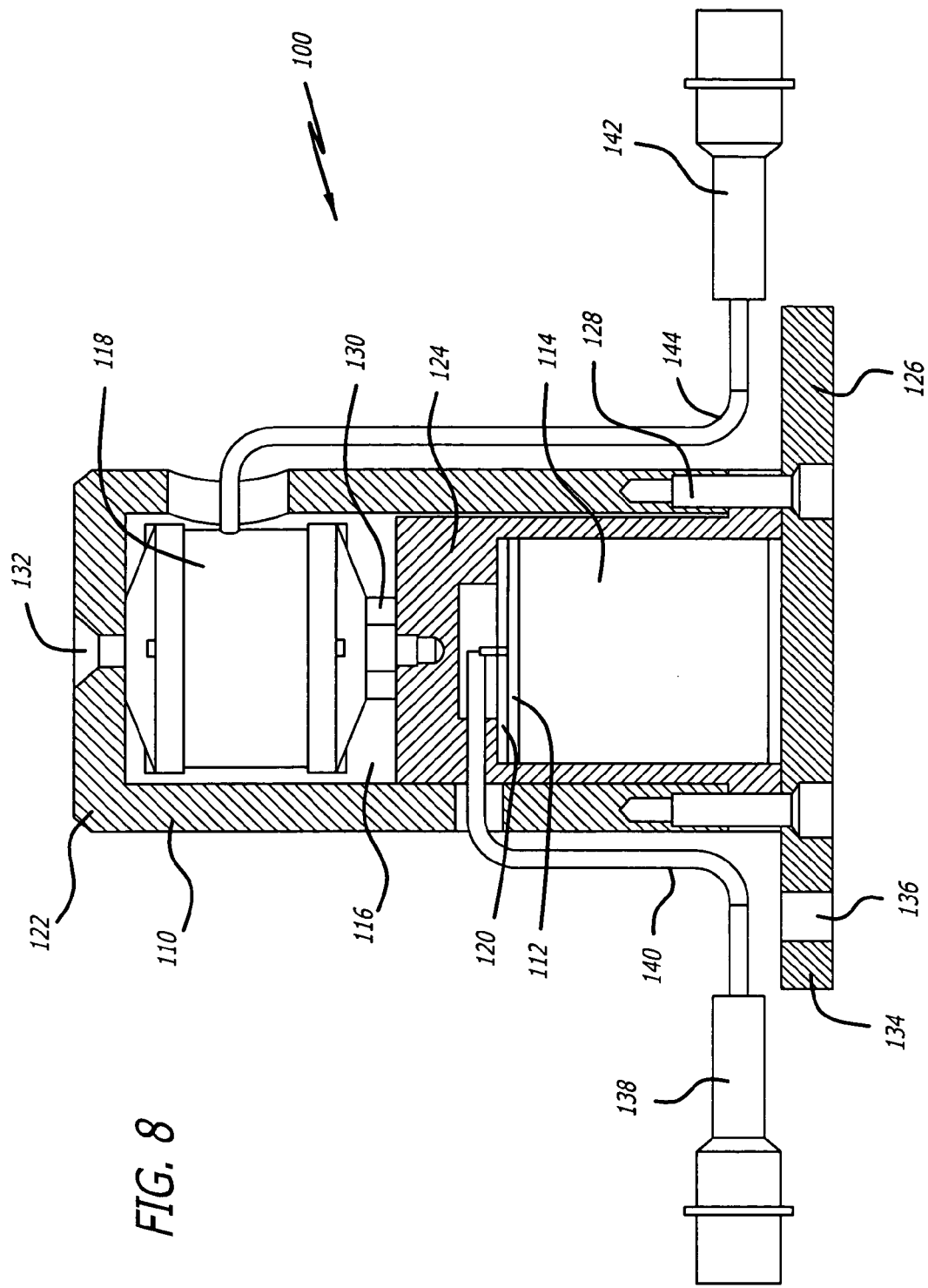
FIG. 8 is a cross-sectional view of an embodiment of a vibration damper assembly.

FIG. 8 shows an embodiment of a vibration damper assembly 100. The assembly 100 includes a housing 110. The housing 110 may include a first compartment 112 that contains a vibration sensor 114 and a second compartment 116 that contains a damper 118. The sensor 114 and damper 118 can be the same as the sensor and damper shown in FIG. 4 and described in the accompanying text. For example, the damper 118 may include one or more active actuators. The first compartment 112 may be sealed by an O-ring 120 or other type of seal.

The housing 110 may be constructed from metal material to isolate the sensor 114 from electromagnetic noise, particularly noise produced by the damper 118. The housing 110 may actually be constructed from an outer shell 122, an inner shell 124 and a base 126. The housing components 122, 124 and 126 may be attached together by a plurality of fasteners 128. The damper 118 may be coupled to the inner shell 124 by a threaded adapter 130 and held in place by fastener 132.

The base 126 may have a collar 134 with a plurality of apertures 136 that provide thru holes for fasteners (see FIG. 7) that attach the assembly 100 to a table. Although thru holes are shown and described, it is to be understood that other means may be employed to attach the assembly to the table. For example, the base 126 may have a plurality of studs that extend from the collar 134 and can be pressed into the apertures 30 of the table.

The assembly 100 may include a first electrical connector 138 that is attached to the sensor 114 by a wire(s) 140 and a second electrical connector 142 that is connected to the damper 118 by a wire(s) 144. The connectors 138 and 142 can be connected to the controller 106 shown in FIG. 7.

In operation, the vibration damper assembly(ies) 100 is attached to the payload surface 14 by inserting the fasteners 104 through the collar apertures 136 and securing the housing 110 to the table 12. The connectors are 138 and 142 are connected to the controller 106, although it is to be understood that the connectors 138 and 142 can be connected before attachment of the housing 110 to the table 12. The vibration sensor 114 senses vibration and provides a signal(s) to the controller 106. The controller 106 processes the signal(s) and provides a drive signal(s) to the damper 118 to dampen the vibration.

The operator can attach a monitor (see FIG. 3) to the assembly 100 to utilize the sensor to sense vibration at the table location. The operator can move the assembly 100 around to sense vibration at different locations of the payload surface 14 and to optimize damping of the table 12.

Figure 9:
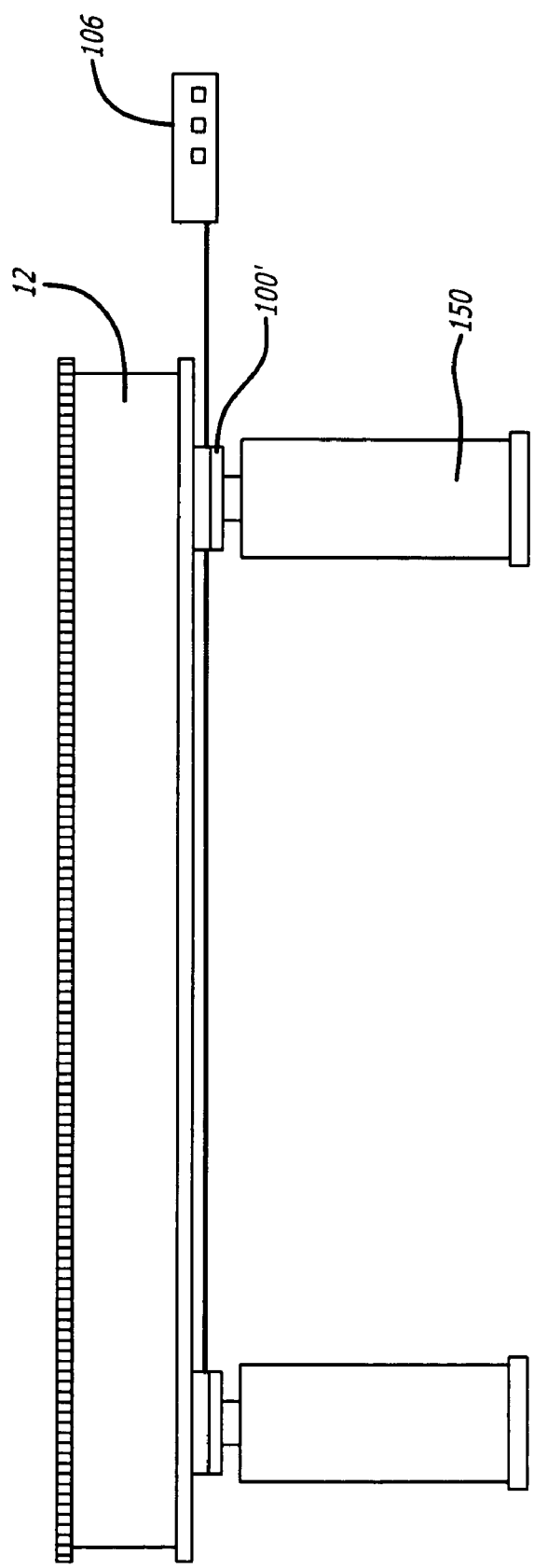
FIG. 9 is a side view of a table assembly with a vibration damping assembly located between a table and a vibration isolator.

FIG. 9 shows an embodiment of a table assembly with a vibration damping assembly 100' located between a table 12 and a vibration isolator 150. The function of the vibration isolator 150 is primarily to isolate the table 12 from vibration in the floor. The vibration damping assembly 100' and isolator 150 are in separate housings which allows an operator to add, or remove the damping assembly 100' from the table assembly. The vibration isolator 150 may be of any type known in the art. By way of example, the isolator 150 may be a product sold by the assignee, Newport Corporation of Irvine, Calif. The separate damping assembly provides the operator with flexibility in damping vibration in the table. Although not shown in FIGS. 1, 3 and 7, it is to be understood that the table 12 shown in these Figures may be supported by the isolator 150 or any other structure such as table legs.

While certain exemplary embodiments have been described and shown in the accompanying drawings, it is to be understood that such embodiments are merely illustrative of and not restrictive on the broad invention, and that this invention not be limited to the specific constructions and arrangements shown and described, since various other modifications may occur to those ordinarily skilled in the art.

In particular, the structure referred to as a table may be any kind of a support structure, including multi-level platforms or cradle platforms. The working surface of this support structure may be horizontal, vertical or even inclined. Accordingly, the line of action of the sensors and active dampers can be vertical, horizontal or inclined; multidirectional sensors or active dampers are also possible as a modification of this invention.

Although FIG. 4 shows an actuator that is implemented as an electromagnetic shaker with a moving magnet and a stationary coil, other types of actuator designs can be used, in particular, electromagnetic designs with stationary magnets and moving coils, electrodynamic designs with one stationary and one moving coil, etc. Alternatively, stiff (e.g. piezoelectric) actuators can be employed to create a relative motion of the reactive mass and the table.

Active dampers are typically located at fixed positions, normally at the corners of the table. This arrangement allows for effective reduction of natural vibrations of the table at its resonance frequencies. It may not be effective for reducing forced vibration of the table caused by mechanical or acoustical excitation at a fixed frequency. Even if programmed to create increased mechanical impedance at this frequency, they would reduce vibration only locally at the installation point. The add-on controlled dampers according to the present invention can be installed near the most vibration-sensitive components or near the sources of forced vibration and programmed to reduce vibration at certain fixed frequencies, thereby providing protection against forced vibrations.

What is claimed is:

1. A vibration damper assembly that can be attached to a table having a payload surface, and a second surface supported by table legs, comprising:
   a housing with an attachment feature that allows said housing to be detachably coupled to the payload surface of the table, the attachment feature comprising a collar having at least one aperture formed therein;
   a vibration sensor located within said housing; and,
   a damper having an active actuator located within said housing.

2. The assembly of claim 1, wherein said housing includes a first compartment that contains said vibration sensor and a second compartment that contains said damper.

3. The assembly of claim 1, further comprising an electrical connector that is connected to said sensor and extends from said housing.

4. The assembly of claim 1, further comprising an electrical connector that is connected to said damper and extends from said housing.

5. The assembly of claim 1, wherein said housing is constructed from a metal material.

6. A vibration damper assembly that can be attached to a table having a payload surface, and a second surface that is coupled to a structure, comprising:
   a housing with attachment device for allowing said housing to be detachably coupled to the payload surface of the table, the attachment feature comprising a collar having at least one aperture formed therein;
   a vibration sensor located within said housing; and,
   a damper located within said housing.

7. The assembly of claim 6, wherein said housing includes a first compartment that contains said vibration sensor and a second compartment that contains said damper.

8. The assembly of claim 6, further comprising an electrical connector that is connected to said sensor and extends from said housing.

9. The assembly of claim 6, further comprising an electrical connector that is connected to said damper and extends from said housing.

10. The assembly of claim 6, wherein said housing is constructed from a metal material.

* * * * *